United States Patent
Ishii et al.

(10) Patent No.: US 8,331,004 B2
(45) Date of Patent: Dec. 11, 2012

(54) MIRROR DRIVING CIRCUIT AND OPTICAL SWITCH

(75) Inventors: Yuji Ishii, Fukuoka (JP); Takashi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 12/411,008

(22) Filed: Mar. 25, 2009

(65) Prior Publication Data

US 2009/0244674 A1    Oct. 1, 2009

(30) Foreign Application Priority Data

Mar. 26, 2008    (JP) .................................. 2008-081358

(51) Int. Cl.
*G02B 26/08* (2006.01)
(52) U.S. Cl. .................................. 359/198.1; 359/199.1
(58) Field of Classification Search ............... 359/198.1, 359/199.1, 212.2
See application file for complete search history.

(56) References Cited

U.S. PATENT DOCUMENTS

| | | | | |
|---|---|---|---|---|
| 3,776,640 A * | 12/1973 | Ikegami | ......................... | 356/639 |
| 5,204,778 A * | 4/1993 | Bechtel | ......................... | 359/604 |
| 5,475,523 A * | 12/1995 | Shinada | ......................... | 359/209.1 |
| 5,714,752 A * | 2/1998 | Ueno et al. | ......................... | 250/208.1 |
| 5,742,042 A * | 4/1998 | Scofield | ......................... | 235/462.36 |
| 6,038,358 A * | 3/2000 | Nishiki | ......................... | 385/37 |
| 6,504,641 B2 | 1/2003 | Chan | | |
| 6,600,591 B2 * | 7/2003 | Anderson et al. | ......................... | 359/291 |
| 7,155,125 B2 | 12/2006 | Mori | | |
| 7,273,289 B2 * | 9/2007 | Denham | ......................... | 359/872 |
| 7,368,846 B2 * | 5/2008 | Mushika et al. | ......................... | 310/309 |
| 7,532,375 B2 * | 5/2009 | Rosman et al. | ......................... | 359/196.1 |
| 2006/0204261 A1 * | 9/2006 | Shimura et al. | ......................... | 399/49 |
| 2008/0037130 A1 * | 2/2008 | Turnbull et al. | ......................... | 359/604 |
| 2008/0074562 A1 * | 3/2008 | Endo et al. | ......................... | 348/758 |
| 2008/0100899 A1 | 5/2008 | Shimokawa et al. | | |
| 2008/0212157 A1 | 9/2008 | Ishii et al. | | |
| 2009/0244677 A1 | 10/2009 | Mizukami et al. | | |

FOREIGN PATENT DOCUMENTS

| | | |
|---|---|---|
| JP | 2002-236265 A | 8/2002 |
| JP | 2003-149614 | 5/2003 |
| JP | 2004-219469 | 8/2004 |
| JP | 2004-239649 | 8/2004 |
| JP | 2004-294989 A | 10/2004 |
| JP | 2008-046448 A | 2/2008 |

(Continued)

OTHER PUBLICATIONS

Office Action, Notice of Rejection issued by Japanese Patent Office in corresponding patent application No. 2008-081358, on Nov. 13, 2009. Partial English-language translation provided.

(Continued)

*Primary Examiner* — Frank Font
(74) *Attorney, Agent, or Firm* — Fujitsu Patent Center

(57) ABSTRACT

A mirror driving circuit applies a voltage to drive a mirror and switches an optical path of light output from a channel of an input port to a channel of an output port. The mirror driving circuit includes an offset-voltage applying unit that applies an offset voltage to the mirror, an applied-voltage determining unit that determines an applied voltage to be applied to the mirror based on a relation between the channel of the input port and the channel of the output port forming a path of the light, and a voltage applying unit that applies to the mirror a remaining voltage obtained by subtracting the offset voltage from the applied voltage.

7 Claims, 12 Drawing Sheets

FOREIGN PATENT DOCUMENTS

| | | |
|---|---|---|
| JP | 2008-046449 | 2/2008 |
| JP | 2008-046454 A | 2/2008 |
| JP | 2008-046455 A | 2/2008 |
| JP | 2008-170904 | 7/2008 |
| JP | 2009-098178 A | 5/2009 |
| WO | WO-2006/073111 | 7/2006 |

OTHER PUBLICATIONS

"Japanese Office Action" mailed by JPO and corresponding to Japanese application No. 2008-081358 on Mar. 1, 2011, with partial English translation.

* cited by examiner

FIG.3

MANAGEMENT TABLE

| INPUT CHANNEL | OUTPUT CHANNEL | FIRST OFFSET VOLTAGE [V] | INPUT MIRROR VOLTAGE | | SECOND OFFSET VOLTAGE [V] | OUTPUT MIRROR VOLTAGE | |
|---|---|---|---|---|---|---|---|
| | | | VERTICAL VOLTAGE [V] | HORIZONTAL VOLTAGE [V] | | VERTICAL VOLTAGE [V] | HORIZONTAL VOLTAGE [V] |
| 1 | 1 | -185 | 10 | 5 | -185 | 12 | 2 |
| 1 | 2 | -185 | 9 | 7 | -185 | 13 | 14 |
| 1 | 3 | -185 | 1 | 5 | -185 | 14 | 6 |
| 2 | 1 | -185 | 3 | 11 | -185 | 13 | 11 |
| 2 | 2 | -185 | 9 | 5 | -185 | 9 | 5 |
| 2 | 3 | -185 | 13 | 14 | -185 | 7 | 14 |
| 3 | 1 | -185 | 14 | 6 | -185 | 14 | 6 |
| 3 | 2 | -185 | 2 | 3 | -185 | 1 | 5 |
| 3 | 3 | -185 | 14 | 4 | -185 | 3 | 11 |
| | | MAXIMUM VOLTAGE | 14 | | | | |

FIG.5

MANAGEMENT TABLE

| INPUT CHANNEL | OUTPUT CHANNEL | FIRST OFFSET VOLTAGE [V] | INPUT MIRROR VOLTAGE | | SECOND OFFSET VOLTAGE [V] | OUTPUT MIRROR VOLTAGE | |
|---|---|---|---|---|---|---|---|
| | | | VERTICAL VOLTAGE [V] | HORIZONTAL VOLTAGE [V] | | VERTICAL VOLTAGE [V] | HORIZONTAL VOLTAGE [V] |
| 1 | 1 | 185 | 10 | 5 | 185 | 12 | 2 |
| 1 | 2 | 185 | 9 | 7 | 185 | 13 | 14 |
| 1 | 3 | 185 | 1 | 5 | 185 | 14 | 6 |
| 2 | 1 | 185 | 3 | 11 | 185 | 13 | 11 |
| 2 | 2 | 185 | 9 | 5 | 185 | 9 | 5 |
| 2 | 3 | 185 | 13 | 14 | 185 | 7 | 14 |
| 3 | 1 | 185 | 14 | 6 | 185 | 14 | 6 |
| 3 | 2 | 185 | 2 | 3 | 185 | 1 | 5 |
| 3 | 3 | 185 | 14 | 4 | 185 | 3 | 11 |
| | | MAXIMUM VOLTAGE | 14 | | | | |

FIG.7

MANAGEMENT TABLE

| INPUT CHANNEL | OUTPUT CHANNEL | FIRST OFFSET VOLTAGE [V] | INPUT MIRROR VOLTAGE | | SECOND OFFSET VOLTAGE [V] | OUTPUT MIRROR VOLTAGE | |
|---|---|---|---|---|---|---|---|
| | | | VERTICAL VOLTAGE [V] | HORIZONTAL VOLTAGE [V] | | VERTICAL VOLTAGE [V] | HORIZONTAL VOLTAGE [V] |
| 1 | 1 | 185 | 10 | 5 | 140 | 7 | 7 |
| 1 | 2 | 185 | 9 | 7 | 140 | 8 | 9 |
| 1 | 3 | 185 | 1 | 5 | 140 | 9 | 1 |
| 2 | 1 | 185 | 3 | 11 | 140 | 8 | 6 |
| 2 | 2 | 170 | 4 | 0 | 160 | 4 | 0 |
| 2 | 3 | 170 | 8 | 9 | 160 | 2 | 9 |
| 3 | 1 | 170 | 9 | 1 | 160 | 9 | 1 |
| 3 | 2 | 170 | 7 | 8 | 160 | 6 | 0 |
| 3 | 3 | 170 | 9 | 14 | 160 | 8 | 14 |
| MAXIMUM VOLTAGE | | | 14 | | | | |

GENERAL-PURPOSE DAC UNIT: 0 V TO 15 V
POWER SUPPLYING UNIT: 185 V
VOLTAGE ADDITION RESULT: 185 V TO 200 V

GENERAL-PURPOSE DAC UNIT: -7.5 V TO +7.5 V
GENERAL-PURPOSE DAC UNIT: 192.5 V
VOLTAGE ADDITION RESULT: 185 V TO 200 V

FIG.11

MANAGEMENT TABLE

| INPUT CHANNEL | OUTPUT CHANNEL | FIRST OFFSET VOLTAGE [V] | INPUT MIRROR VOLTAGE | | SECOND OFFSET VOLTAGE [V] | OUTPUT MIRROR VOLTAGE | |
|---|---|---|---|---|---|---|---|
| | | | VERTICAL VOLTAGE [V] | HORIZONTAL VOLTAGE [V] | | VERTICAL VOLTAGE [V] | HORIZONTAL VOLTAGE [V] |
| 1 | 1 | 192.5 | 2.5 | 2.5 | 147.5 | -0.5 | -0.5 |
| 1 | 2 | 192.5 | 1.5 | -0.5 | 147.5 | 0.5 | 1.5 |
| 1 | 3 | 192.5 | -6.5 | -2.5 | 147.5 | 1.5 | -6.5 |
| 2 | 1 | 192.5 | -4.5 | 3.5 | 147.5 | 0.5 | -1.5 |
| 2 | 2 | 177.5 | -3.5 | -7.5 | 167.5 | -3.5 | -7.5 |
| 2 | 3 | 177.5 | 0.5 | 1.5 | 167.5 | -5.5 | 1.5 |
| 3 | 1 | 177.5 | 1.5 | -6.5 | 167.5 | 1.5 | -6.5 |
| 3 | 2 | 177.5 | -0.5 | 0.5 | 167.5 | -1.5 | -7.5 |
| 3 | 3 | 177.5 | 1.5 | 6.5 | 167.5 | 0.5 | 6.5 |
| | | MAXIMUM VOLTAGE | 6.5 | MAXIMUM VOLTAGE | -7.5 | MAXIMUM-MINIMUM | 14 |

FIG.12

| INPUT CHANNEL | OUTPUT CHANNEL | INPUT MIRROR VOLTAGE | | OUTPUT MIRROR VOLTAGE | | MANAGEMENT TABLE |
|---|---|---|---|---|---|
| | | VERTICAL VOLTAGE [V] | HORIZONTAL VOLTAGE [V] | VERTICAL VOLTAGE [V] | HORIZONTAL VOLTAGE [V] |
| 1 | 1 | 195 | 190 | 147 | 147 |
| 1 | 2 | 194 | 192 | 148 | 149 |
| 1 | 3 | 186 | 190 | 149 | 141 |
| 2 | 1 | 188 | 196 | 148 | 146 |
| 2 | 2 | 174 | 170 | 164 | 160 |
| 2 | 3 | 178 | 179 | 162 | 169 |
| 3 | 1 | 179 | 171 | 169 | 161 |
| 3 | 2 | 177 | 178 | 166 | 160 |
| 3 | 3 | 179 | 184 | 168 | 174 |
| | | MAXIMUM VOLTAGE 196 | MAXIMUM VOLTAGE 141 | MAXIMUM-MINIMUM | (55) |

VARIATIONS IN MEMS MIRRORS

FIG.15

| INPUT CHANNEL | OUTPUT CHANNEL | INPUT MIRROR VOLTAGE | | OUTPUT MIRROR VOLTAGE | |
|---|---|---|---|---|---|
| | | VERTICAL VOLTAGE [V] | HORIZONTAL VOLTAGE [V] | VERTICAL VOLTAGE [V] | HORIZONTAL VOLTAGE [V] |
| 1 | 1 | 195 | 190 | 197 | 187 |
| 1 | 2 | 194 | 192 | 198 | 199 |
| 1 | 3 | 186 | 190 | 199 | 191 |
| 2 | 1 | 188 | 196 | 198 | 196 |
| 2 | 2 | 194 | 190 | 194 | 190 |
| 2 | 3 | 198 | 199 | 192 | 199 |
| 3 | 1 | 199 | 191 | 199 | 191 |
| 3 | 2 | 187 | 188 | 186 | 190 |
| 3 | 3 | 199 | 189 | 188 | 196 |

MANAGEMENT TABLE

MIRROR DRIVING CIRCUIT AND OPTICAL SWITCH

CROSS-REFERENCE TO RELATED APPLICATION

This application is based upon and claims the benefit of priority of the prior Japanese Patent Application No. 2008-081358, filed on Mar. 26, 2008, the entire contents of which are incorporated herein by reference.

FIELD

The embodiments discussed herein are directed to Optical Cross-Connect (OXC) systems for Wavelength Division Multiplexing (WDM) communications, and the like, and, in particular, a mirror driving circuit and an optical switch using a Micro Electro Mechanical System (MEMS) mirror.

BACKGROUND

In recent years, Internet users have been rapidly increasing. To support increasing communication traffics, optical networks capable of high-speed communications have been widely used. In such optical networks, with an increasing number of nodes for connection and the number of wavelengths, an optical switch using a Micro Electro Mechanical System (MEMS) mirror is used (for example, refer to Japanese Patent Application Laid-open Publication No. 2004-219469).

The configuration of a switch using a MEMS mirror (hereinafter, MEMS optical switch) is explained. FIG. 13 is a drawing of the configuration of a conventional MEMS optical switch. As depicted in FIG. 13, a MEMS optical switch 10 includes an input port 11, an output port 12, an input mirror 13, and an output mirror 14. Other components are similar to those of a known optical switch, and therefore are not exampled herein.

In the MEMS optical switch 10, by controlling the angle of MEMS mirrors placed on the input mirror 13 and the output mirror 14, light input from a channel in the input port 11 is caused to be output from an arbitrary channel in the output port 12.

When it is assumed that the number of channels of the input port 11 is 60 and the number of channels of the output port 12 is 60, the input mirror 13 requires 64 MEMS mirrors and the output mirror 14 requires 64 MEMS mirrors. Therefore, 128 MEMS mirrors in total are required to be controlled.

To control MEMS mirrors, a high voltage (for example, 200 volts [V]) is applied to an electrode of each MEMS mirror in each of vertical and horizontal directions, thereby generating an electrostatic force to control the MEMS mirror (in other words, tilting the MEMS mirror in an arbitrary direction).

Next, a mirror driving circuit that controls MEMS mirrors is explained. FIG. 14 is a functional block diagram of the configuration of a conventional mirror driving circuit. As depicted in FIG. 14, a mirror driving circuit 20 includes a MEMS mirror 21, a connection substrate (Dpram) 22, a computing unit 23, and a high-voltage Digital Analog Converter (DAC) unit 24.

Among these, the MEMS mirror 21 corresponds to the MEMS mirrors placed on the input mirror 13 and the output mirror 14 depicted in FIG. 13. For example, when the number of channels of the input port 11 is 60 and the number of channels of the output port 12 is 60, the MEMS mirror 21 is formed of 128 MEMS mirrors.

The connection substrate (Dpram) 22 is connected to a host device (not depicted in FIG. 14) to control data communications with the host device and to store connection information output from the host device. The connection information indicates a relation between the channels of the input port 11 and the channels of the output port 12 for connection. For example, the connection information includes information indicating that light output from the channel 1 of the input port 11 is input to the channel 2 of the output port 12.

The computing unit 23 computes drive voltages (vertical voltage and horizontal voltage) for driving the MEMS mirror 21 based on the connection information stored in the connection substrate 22, and outputs, as the computation results, information about the drive voltages to the high-voltage DAC unit 24.

Specifically, the computing unit 23 holds a management table, and compares the management table and the connection information to compute drive voltages. FIG. 15 is a drawing of an example of data structure of a conventional management table. As depicted in FIG. 15, the management table has stored therein an input channel, an output channel, an input mirror voltage, and an output mirror voltage in association with each other.

The input channel corresponds to a channel in the input port 11, while the output channel corresponds to a channel in the output port 12. The input mirror voltage indicates voltage (vertical voltage and horizontal voltage) to be applied to a predetermined MEMS mirror placed on the input mirror 13, whilst the output mirror voltage indicates voltage (vertical voltage and horizontal voltage) to be applied to a predetermined MEMS mirror placed on the output mirror 14.

For example, when light input from an input channel "1" is output from an output channel "1", the input mirror voltage is such that the vertical voltage is "195 volts" and the horizontal voltage is "190 volts", and the output mirror voltage is such that the vertical voltage is "197 volts" and the horizontal voltage is "187 volts".

The high-voltage DAC unit 24 applies voltages to the MEMS mirror 21 based on the information about the drive voltages obtained from the computing unit 23 to control the angle of each relevant MEMS mirror of the MEMS mirror 21.

In the conventional technology, however, a plurality of DAC units that can apply a high voltage are required to control each MEMS mirror placed on the input mirror 13 and the output mirror 14. Since such DAC units are extremely expensive compared with general-purpose DAC units, manufacturing cost is disadvantageously high.

SUMMARY

It is an object of the present invention to at least partially solve the problems in the conventional technology.

According to one aspect of the present invention, A mirror driving circuit applies a voltage to drive a mirror and switches an optical path of light output from a channel of an input port to a channel of an output port, and the mirror driving circuit includes an offset-voltage applying unit that applies an offset voltage to the mirror, an applied-voltage determining unit that determines an applied voltage to be applied to the mirror based on a relation between the channel of the input port and the channel of the output port forming a path of the light, and a voltage applying unit that applies to the mirror a remaining voltage obtained by subtracting the offset voltage from the applied voltage.

According to another aspect of the present invention, a mirror driving circuit applies a voltage to drive a mirror and switches an optical path of light output from a channel of an input port to a channel of an output port, and the mirror driving circuit includes an offset-voltage output unit that outputs an offset voltage, an applied-voltage determining unit that determines an applied voltage to be applied to the mirror based on a relation between the channel of the input port and the channel of the output port forming a path of the light, a voltage output unit that outputs a remaining voltage obtained by subtracting the offset voltage from the applied voltage, and a voltage adding unit that adds the offset voltage output from the offset-voltage output unit and the voltage output from the voltage output unit together and applies a voltage obtained through addition to the mirror.

According to still another aspect of the present invention, an optical switch transmitting an optical signal includes the mirror driving circuit as described above.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 3 is a drawing of an example of the data structure of a management table according to the first embodiment;

FIG. 5 is a drawing of an example of the data structure of a management table according to the second embodiment;

FIG. 7 is a drawing of an example of the data structure of a management table according to the third embodiment;

FIG. 11 is a drawing of an example of the data structure of a management table according to the fourth embodiment;

FIG. 12 is a drawing of a conventional management table with large variations in drive voltage of a MEMS switch;

FIG. 15 is a drawing of an example of the data structure of a conventional management table.

DESCRIPTION OF EMBODIMENTS

With reference to the attached drawings, exemplary embodiments of a mirror driving circuit and an optical switch according to the present invention are explained in detail below.

[a] First Embodiment

First, general outlines and features of a mirror driving circuit according to a first embodiment are explained. With application of a voltage to an electrode of a MEMS mirror (i.e., with static electricity between the MEMS mirror and the electrode), the mirror driving circuit controls the angle of the MEMS mirror and switches an optical path of light.

Here, a relation between the control voltage and the control angle can be represented by:

$$\theta = \alpha \times V^2,$$

where $\theta$ is a control angle, $\alpha$ is a hardness coefficient, and $V$ is a control voltage.

To make the mirror tilted at 6 degrees, for example, a DAC unit that can apply a high voltage on the order of 200 volts (hereinafter, a high-voltage DAC unit) is required, although depending on the hardness coefficient $\alpha$. Furthermore, for a MEMS optical switch that can switch among a plurality of channels, high-voltage DAC units as many as the number of mirrors are required. Since the high-voltage DAC unit is an extremely expensive circuit, such requirement is a cause of increasing cost.

To get around this problem, the mirror driving circuit according to the first embodiment applies a minus high voltage (offset voltage) to an electrode of the MEMS mirror to which a ground (GND) potential is applied, thereby making it possible to significantly decrease the voltage of a DAC unit for mirror control. In addition, with the voltage to be output from the DAC unit being significantly reduced, the DAC unit for mirror control is replaced by a general-purpose DAC unit, thereby reducing cost of the mirror driving circuit (MEMS optical switch including the mirror driving circuit).

Figure 1:
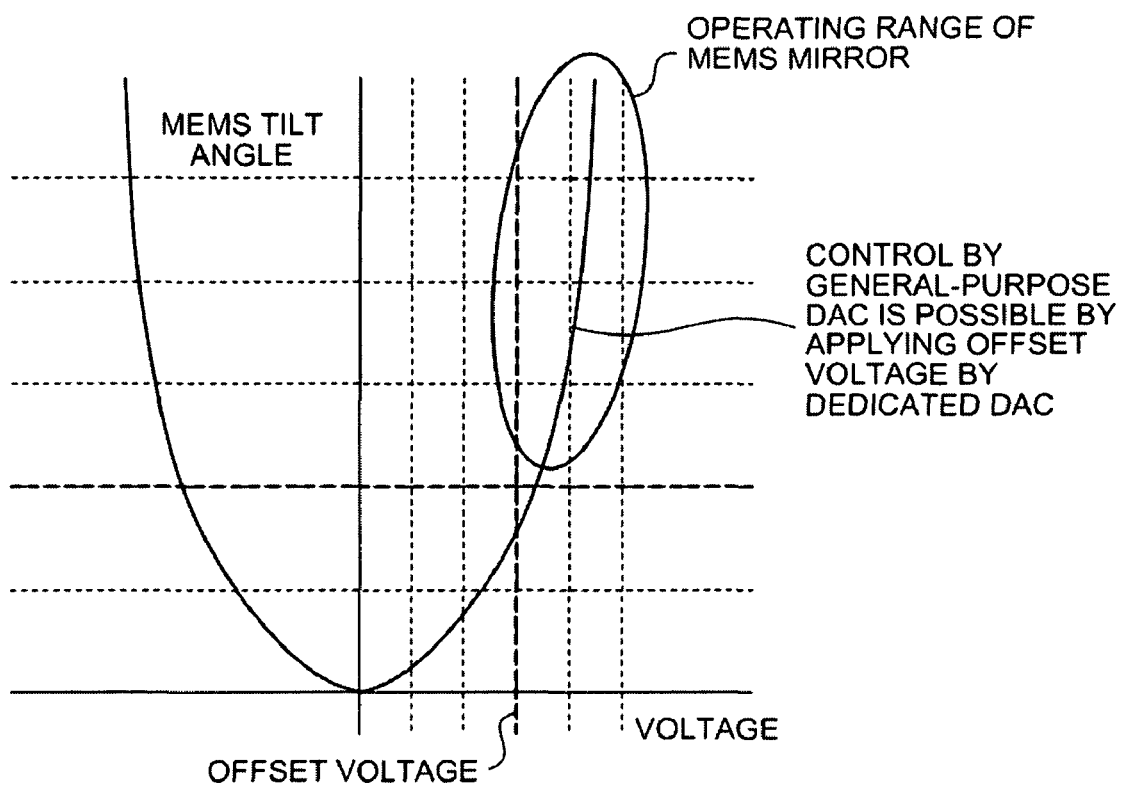
FIG. 1 is a drawing that depicts a relation between a drive voltage of a MEMS mirror and a tilt angle of the MEMS mirror.

FIG. 1 is a drawing that depicts a relation between a drive voltage of the MEMS mirror and a tilt angle of the MEMS mirror. As depicted in FIG. 1, in the conventional technology, when the drive voltage of the MEMS mirror is set at 185 volts to 200 volts, for example, the high-voltage DAC unit that controls each MEMS mirror has to continuously apply a voltage of 185 volts to 200 volts so as to switch an optical path.

By contrast, in the mirror driving circuit according to the first embodiment, a dedicated DAC applies a GND potential of the offset voltage (for example, −185 volts) to the MEMS mirror. With this, the drive voltage of the MEMS mirror becomes on the order of 15 volts. Therefore, each MEMS mirror can be controlled with a low-cost general-purpose DAC.

Figure 2:
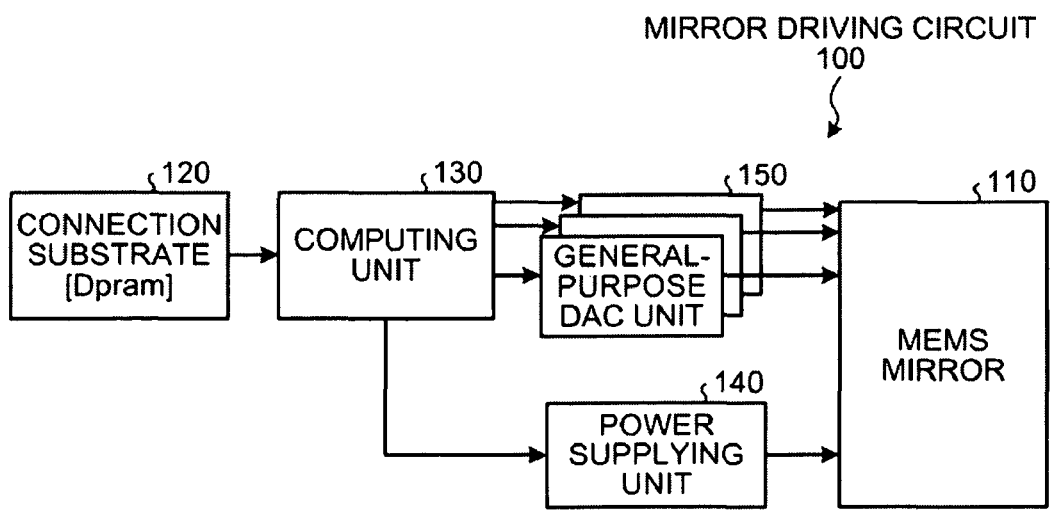
FIG. 2 is a functional block diagram of the configuration of a mirror driving circuit according to a first embodiment.

Next, the configuration of the mirror driving circuit according to the first embodiment is explained. FIG. 2 is a functional block diagram of the configuration of a mirror driving circuit 100 according to the first embodiment. As depicted in FIG. 2, the mirror driving circuit 100 includes a MEMS mirror 110, a connection substrate (Dpram) 120, a computing unit 130 (also referred to as "applied-voltage determining unit"), a power supplying unit 140 (also referred to as "offset-voltage applying unit"), and a general-purpose DAC unit 150 (also referred to as "voltage applying unit").

Figure 13:
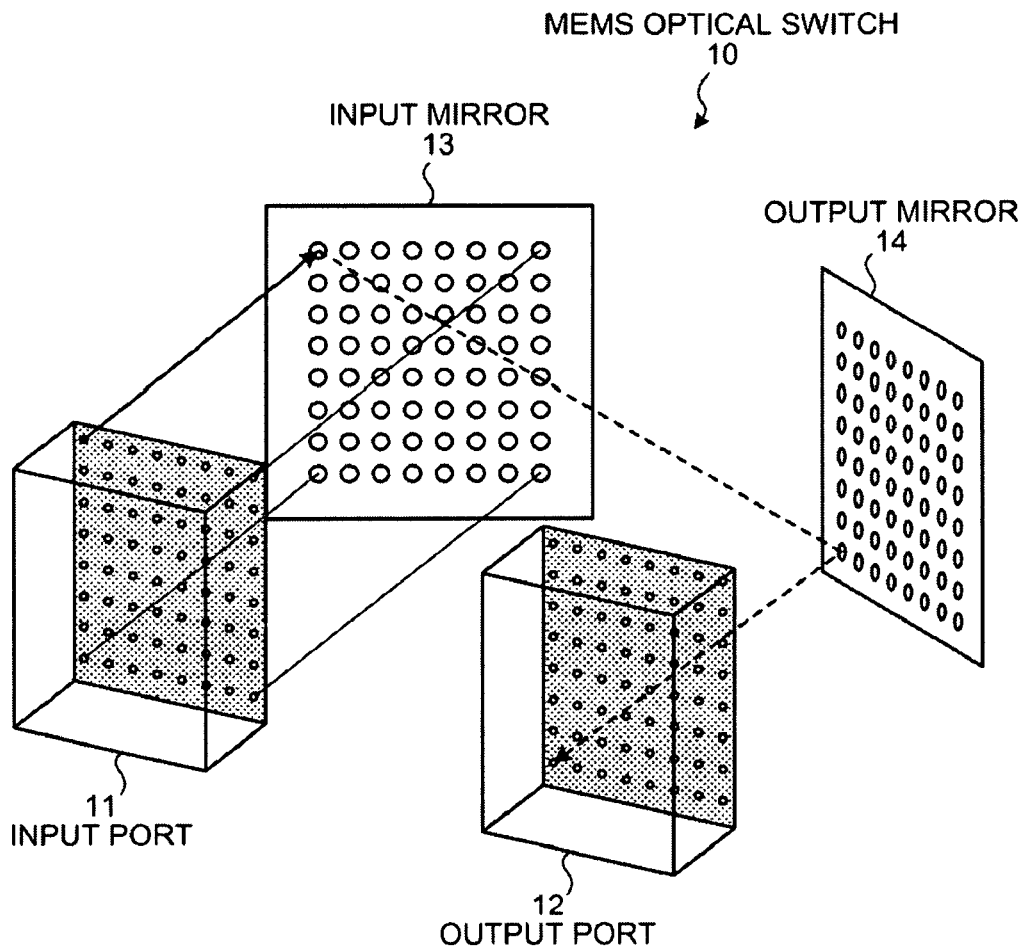
FIG. 13 is a drawing of the configuration of a conventional MEMS optical switch.
Figure 14:
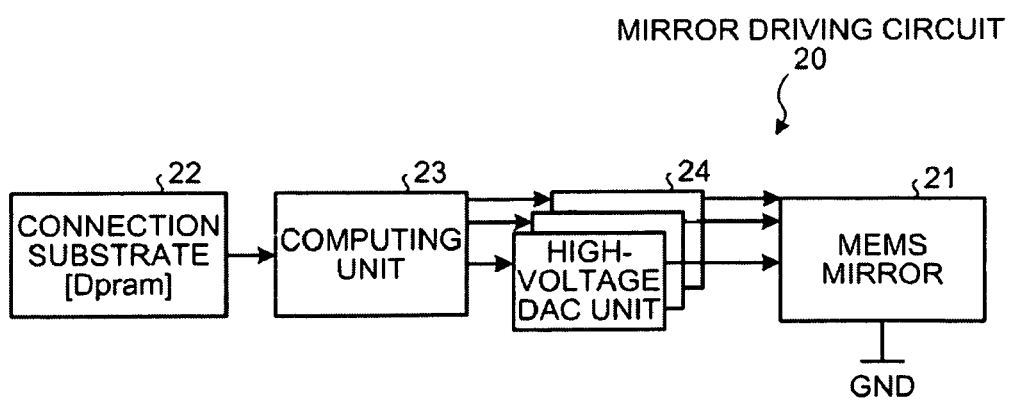
FIG. 14 is a functional block diagram of the configuration of a conventional mirror driving circuit.

Among these, the MEMS mirror 110 corresponds to the MEMS mirrors (with n channels; where n is a natural number) placed on the input mirror 13 and the output mirror 14 depicted in FIG. 13. The MEMS mirror 110 is formed of 128 MEMS mirrors when the number of channels of the input port 11 is 60 and the number of channels of the output port 12 is 60, for example.

Each MEMS mirror included in the MEMS mirror 110 has an electrode in each of vertical and horizontal directions.

With a voltage being applied to an electrode in one or both of the vertical direction and the horizontal direction, the angle of the mirror is controlled.

The connection substrate (Dpram) 120 is connected to a host device (not depicted in FIG. 2), to control data communications with the host device and to store connection information output from the host device. The connection information indicates a relation between the channels of the input port 11 and the channels of the output port 12 for connection. For example, the connection information includes information indicating that light output from the channel 1 of the input port 11 is input to the channel 2 of the output port 12.

The computing unit 130 computes drive voltages (vertical voltage and horizontal voltage) for driving the MEMS mirror 110 and offset voltages based on the connection information stored in the connection substrate 120 and outputs, as the computation results, the drive voltages to the general-purpose DAC unit 150 and information about the offset voltages to the power supplying unit 140.

Specifically, the computing unit 130 holds a management table, and compares the management table and the connection information to compute drive voltages and offset voltages. FIG. 3 is a drawing of an example of a data structure of the management table according to the first embodiment. As depicted in FIG. 3, the management table has stored therein an input channel, an output channel, a first offset voltage, input mirror voltages, a second offset voltage, and output mirror voltages in association with each other.

The input channel corresponds to a channel in the input port 11, while the output channel corresponds to a channel in the output port 12. The first offset voltage indicates a GND potential to be applied to the input mirror 13. The input mirror voltages indicate voltages (vertical voltage and horizontal voltage) to be applied to a predetermined MEMS mirror placed on the input mirror 13.

The second offset voltage indicates a GND potential to be applied to the output mirror 14. The output mirror voltages indicate voltages (vertical voltage and horizontal voltage) to be applied to a predetermined MEMS mirror placed on the output mirror 14.

Since a drive voltage required for controlling a MEMS mirror has a value with an offset voltage being subtracted therefrom, a maximum value of the input mirror voltages and the output mirror voltages is on the order of 14 volts, for example.

Conventionally, when light input from an input channel "1" is output from an output channel "1", for example, the high-voltage DAC unit is required to apply a voltage on the order of 195 volts to the MEMS mirror 110. By contrast, in the first embodiment, a voltage of −185 volts is applied to the GND of the MEMS mirror 110, and therefore the general-purpose DAC unit 150 applies only the remaining 10 volts to the MEMS mirror 110.

When light input from the input channel "1" is output from the output channel "1", the computing unit 130 outputs to the general-purpose DAC unit 150 information about the drive voltages indicating that the input mirror voltages are such that the vertical voltage is "10 volts" and the horizontal voltage is "5 volts" and the output mirror voltages are such that the vertical voltage is "12 volts" and the horizontal voltage is "2 volts", and also outputs to the power supplying unit 140 information about the offset voltages indicating that the first offset voltage is "−185 volts" and the second offset voltage is "−185 volts".

The power supplying unit 140 obtains the information about the offset voltages from the computing unit 130, and applies the offset voltages to the GND of the MEMS mirror 110 based on the obtained information about the offset voltages.

When obtaining the information about the offset voltages indicating that the first offset voltage is "−185 volts" and the second offset voltage is "−185 volts", for example, the power supplying unit 140 applies an offset voltage of "−185 volts" to the GND of a relevant MEMS mirror of the input mirror 13 and applies an offset voltage of "−185 volts" to the GND of a relevant MEMS mirror of the output mirror 14.

The general-purpose DAC unit 150 obtains the information about the drive voltages from the computing unit 130, and applies the drive voltages to the MEMS mirror 110 based on the obtained information about the drive voltages. The general-purpose DAC unit 150 includes a plurality of general-purpose DACs.

For example, when obtaining the information about the drive voltages indicating that the input mirror voltages are such that the vertical voltage is "10 volts" and the horizontal voltage is "6 volts" and the output mirror voltages are such that vertical voltage is "12 volts" and the horizontal voltage is "2 volts", the general-purpose DAC unit 150 applies "10 volts" to an electrode in a vertical direction of a relevant MEMS mirror of the input mirror 13 and "6 volts" to an electrode in a horizontal direction thereof, and also applies "12 volts" to an electrode in a vertical direction of a relevant MEMS mirror of the output mirror 14 and "2 volts" to an electrode in a horizontal direction thereof.

As explained above, in the mirror driving circuit 100 according to the first embodiment, the power supplying unit 140 that applies entire offset voltages applies a voltage to a minus side of the MEMS mirror 110, and the low-cost general-purpose DAC unit 150 applies voltages to a plus side thereof, thereby controlling the MEMS mirror 110. Thus, the requirement of using a plurality of expensive high-voltage DAC units can be eliminated, thereby significantly reducing cost.

For example, with application of offset voltages by the power supplying unit 140 (such as a dedicated DAC), control by the general-purpose DAC (on the order of 15 volts) can be achieved. Since the MEMS mirror 110 has a high-voltage and a large amount of angle change per unit potential (refer to FIG. 1), when an offset voltage of 185 volts is applied, a control can be made only for 15 volts at the general-purpose DAC unit 150, but a sufficient angle operating range can be obtained.

In the first embodiment, by way of example, the computing unit 130 computes offset voltages and, based on the computation results, the power supplying unit 140 applies the offset voltages to the MEMS mirror 110. The present invention is not meant to be restricted to this, however, and the offset voltages to be applied by the power supplying unit 140 may be set in advance. Also, the mirror driving circuit 100 depicted in FIG. 2 is assumed to be connected to a MEMS optical switch as depicted in FIG. 13.

[b] Second Embodiment

Next, a mirror driving circuit according to a second embodiment is explained. Unlike the mirror driving circuit 100 according to the first embodiment explained above that applies an offset voltage to the GND side of the MEMS mirror, the mirror driving circuit according to the second embodiment adds a drive voltage output from a general-purpose DAC and an offset voltage together in series, and applies the voltage obtained through addition to the MEMS mirror. With this, the MEMS mirror can be controlled by low-cost general-purpose DACs, thereby reducing cost of the mirror driving circuit (MEMS optical switch including the mirror driving circuit).

Figure 4:
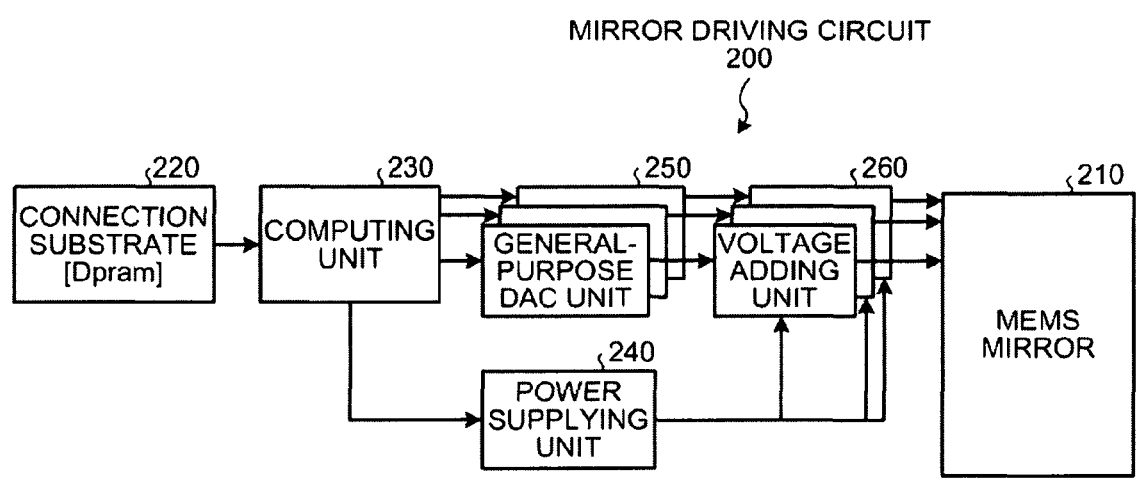
FIG. 4 is a functional block diagram of the configuration of a mirror driving circuit according to a second embodiment.

The configuration of the mirror driving circuit according to the second embodiment is explained next. FIG. 4 is a functional block diagram of the configuration of a mirror driving circuit 200 according to the second embodiment. As depicted in FIG. 4, the mirror driving circuit 200 includes a MEMS mirror 210, a connection substrate (Dpram) 220, a computing unit 230 (may referred to as "applied-voltage determining unit"), a power supplying unit 240 (may referred to as "offset-voltage output unit"), a general-purpose DAC unit 250 (may referred to as "voltage output unit"), and a voltage adding unit 260.

Among these, the MEMS mirror 210 corresponds to the MEMS mirrors (with n channels) placed on the input mirror 13 and the output mirror 14 depicted in FIG. 13. The MEMS mirror 210 is formed of 128 MEMS mirrors when the number of channels of the input port 11 is 60 and the number of channels of the output port 12 is 60, for example.

Each MEMS mirror included in the MEMS mirror 210 has an electrode in each of vertical and horizontal directions. With a voltage being applied to an electrode in one or both of a vertical direction and a horizontal direction, the angle of the mirror is controlled.

The connection substrate (Dpram) 220 is connected to a host device (not depicted in FIG. 4) to control data communications with the host device and to store connection information output from the host device. The connection information indicates a relation between the channels of the input port 11 and the channels of the output port 12 for connection. For example, the connection information includes information indicating that light output from the channel 1 of the input port 11 is input to the channel 2 of the output port 12.

The computing unit 230 computes drive voltages (vertical voltage and horizontal voltage) for driving the MEMS mirror 210 and offset voltages based on the connection information stored in the connection substrate 220 and outputs, as the computation results, the drive voltages to the general-purpose DAC unit 250 and information about the offset voltages to the power supplying unit 240.

Specifically, the computing unit 230 holds a management table, and compares the management table and the connection information to compute drive voltages and offset voltage. FIG. 5 is a drawing of an example of a data structure of the management table according to the second embodiment. As depicted in FIG. 5, the management table has stored therein an input channel, an output channel, a first offset voltage, input mirror voltages, a second offset voltage, and output mirror voltages in association with each other.

The input channel corresponds to a channel in the input port 11, while the output channel corresponds to a channel in the output port 12. The first offset voltage indicates an offset voltage to be applied to the input mirror 13. The input mirror voltages indicate voltages (vertical voltage and horizontal voltage) to be applied to a predetermined MEMS mirror placed on the input mirror 13.

The second offset voltage indicates an offset voltage to be applied to the output mirror 14. The output mirror voltages indicate voltages (vertical voltage and horizontal voltage) to be applied to a predetermined MEMS mirror placed on the output mirror 14.

Since a drive voltage required for controlling a MEMS mirror has a value with an offset voltage being subtracted therefrom, a maximum value of the input mirror voltages and the output mirror voltages is on the order of 14 volts, for example.

Conventionally, when light input from an input channel "1" is output from an output channel "1", for example, the high-voltage DAC unit is required to apply a voltage on the order of 195 volts to the MEMS mirror 210. By contrast, in the second embodiment, the voltage adding unit 260 applies an offset voltage of −185 volts, and therefore the general-purpose DAC unit 250 outputs only the remaining 10 volts to the voltage adding unit 260.

When light input from the input channel "1" is output from the output channel "1", the computing unit 230 outputs to the general-purpose DAC unit 250 information about the drive voltages indicating that the input mirror voltages are such that the vertical voltage is "10 volts" and the horizontal voltage is "5 volts" and the output mirror voltages are such that the vertical voltage is "12 volts" and the horizontal voltage is "2 volts", and also outputs to the power supplying unit 240 information about the offset voltages indicating that the first offset voltage is "185 volts" and the second offset voltage is "185 volts".

The power supplying unit 240 obtains the information about the offset voltages from the computing unit 230, and outputs each of the offset voltages (first offset voltage and second offset voltage) to the voltage adding unit 260 based on the obtained information about the offset voltages.

The general-purpose DAC unit 250 obtains the information about the drive voltages from the computing unit 230, and outputs the drive voltages (first mirror voltage and second mirror voltage) to the voltage adding unit 260 based on the obtained information about the drive voltages. The general-purpose DAC unit 250 includes a plurality of general-purpose DACs.

For example, when obtaining the information about the drive voltages indicating that the input mirror voltages are such that the vertical voltage is "10 volts" and the horizontal voltage is "6 volts" and the output mirror voltages are such that vertical voltage is "12 volts" and the horizontal voltage is "2 volts", the general-purpose DAC unit 250 outputs to the voltage adding unit 260 the input mirror voltages including the vertical voltage of "10 volts" and the horizontal voltage of "6 volts" and the output mirror voltages including the vertical voltage of "12 volts" and the horizontal voltage of "2 volts".

The voltage adding unit 260 adds the first offset voltage output from the power supplying unit 240 and the input mirror voltages input from the general-purpose DAC unit 250 together, and applies the voltage obtained through addition to a relevant one of the MEMS mirrors of the input mirror 13. Also, the voltage adding unit 260 adds the second offset voltage output from the power supplying unit 240 and the output mirror voltages input from the general-purpose DAC unit 250 together, and applies the voltage obtained through addition to a relevant one of the MEMS mirrors of the output mirror 14.

As has been explained above, in the mirror driving circuit 200 according to the second embodiment, the voltage adding unit 260 adds the drive voltage output from the general-purpose DAC unit 250 and the offset voltage in series, and then applies the voltage obtained through addition to a relevant one of the MEMS mirror 210. With this, MEMS mirrors can be controlled by low-cost general-purpose DACs, thereby reducing cost of the mirror driving circuit (MEMS optical switch including the mirror driving circuit).

In the second embodiment, by way of example, the computing unit 230 computes offset voltages and, based on the computation results, the power supplying unit 240 outputs the offset voltages to the voltage adding unit 260. The present invention is not meant to be restricted to this, however, and the offset voltages to be output from the power supplying unit 240 may be set in advance. Also, the mirror driving circuit 200 depicted in FIG. 4 is assumed to be connected to a MEMS optical switch as depicted in FIG. 13.

[c] Third Embodiment

Next, a mirror driving circuit according to a third embodiment is explained. In the mirror driving circuit according to the third embodiment, a plurality of power supplying units that output different offset voltages are provided, and any of these different offset voltages is used for each MEMS mirror (or each electrode of the MEMS mirrors in vertical and horizontal directions), thereby supporting differences in control voltage due to variations in hardness among the MEMS mirrors and differences in hardness in vertical and horizontal directions.

For example, it is assumed that an available offset voltage is one type, such as "130 volts" and the control voltage is "130 volts to 200 volts" depending on variations in hardness among the MEMS mirrors and differences in hardness in vertical and horizontal directions. In this case, an output of 70 volts is required for the DAC unit. Therefore, a general-purpose DAC unit cannot be used, thereby increasing cost.

To get around this problem, the mirror driving circuit according to the third embodiment is provided with a plurality of types of offset voltages (130 volts, 140 volts, 150 volts, 160 volts, 170 volts, 180 volts, and 190 volts) so as to support variations in hardness among the MEMS mirrors and differences in hardness in vertical and horizontal directions (so as to absorb differences in control voltage caused by the differences above). Thus, since only an output on the order of 10 volts is required for the general-purpose DAC unit, the general-purpose DAC unit can be used, thereby reducing cost.

Figure 6:
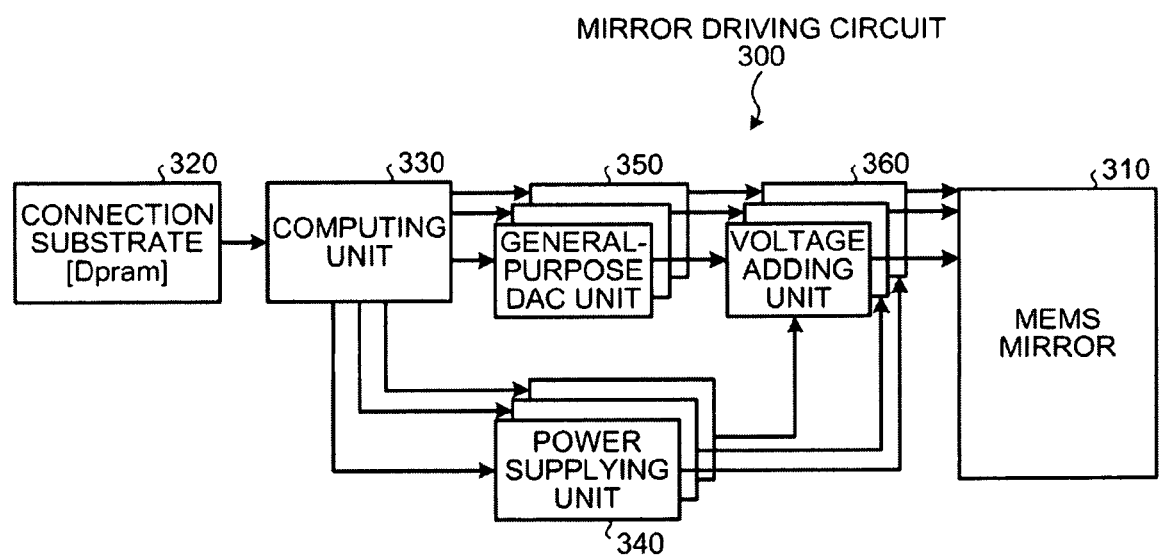
FIG. 6 is a functional block diagram of the configuration of a mirror driving circuit according to a third embodiment.

The configuration of a mirror driving circuit 300 according to the third embodiment is explained next. FIG. 6 is a functional block diagram of the configuration of the mirror driving circuit 300 according to the third embodiment. As depicted in FIG. 6, the mirror driving circuit 300 includes a MEMS mirror 310, a connection substrate (Dpram) 320, a computing unit 330 (applied-voltage determining unit), a power supplying unit 340 (offset-voltage output unit), a general-purpose DAC unit 350 (voltage output unit), and a voltage adding unit 360.

Among these, the MEMS mirror 310 corresponds to the MEMS mirrors (with n channels) placed on the input mirror 13 and the output mirror 14 depicted in FIG. 13. The MEMS mirror 310 is formed of 128 MEMS mirrors when the number of channels of the input port 11 is 60 and the number of channels of the output port 12 is 60, for example.

Each MEMS mirror included in the MEMS mirror 310 has an electrode in each of vertical and horizontal directions. With a voltage being applied to an electrode in one or both of the vertical direction and the horizontal direction, the angle of the mirror is controlled.

The connection substrate (Dpram) 320 is connected to a host device (not depicted in FIG. 6) to control data communications with the host device and to store connection information output from the host device. The connection information indicates a relation between the channels of the input port 11 and the channels of the output port 12 for connection. For example, the connection information includes information indicating that light output from the channel 1 of the input port 11 is input to the channel 2 of the output port 12.

The computing unit 330 computes drive voltages (vertical voltage and horizontal voltage) for driving the MEMS mirror 310 and offset voltages based on the connection information stored in the connection substrate 320, and outputs, as the computation results, the drive voltages to the general-purpose DAC unit 350 and information about the offset voltages to the power supplying unit 340.

Specifically, the computing unit 330 holds a management table, and compares the management table and the connection information to compute drive voltages and offset voltage. FIG. 7 is a drawing of an example of a data structure of the management table according to the third embodiment. As depicted in FIG. 7, the management table has stored therein an input channel, an output channel, a first offset voltage, input mirror voltages, a second offset voltage, and output mirror voltages in association with each other.

The input channel corresponds to a channel in the input port 11, while the output channel corresponds to a channel in the output port 12. The first offset voltage indicates an offset voltage to be applied to the input mirror 13. The input mirror voltages indicate voltages (vertical voltage and horizontal voltage) to be applied to a predetermined MEMS mirror placed on the input mirror 13.

The second offset voltage indicates an offset voltage to be applied to the output mirror 14. The output mirror voltages indicate voltages (vertical voltage and horizontal voltage) to be applied to a predetermined MEMS mirror placed on the output mirror 14.

Since a drive voltage required for controlling a MEMS mirror has a value with an offset voltage being subtracted therefrom, a maximum value of the input mirror voltages and the output mirror voltages is on the order of 14 volts, for example. Also, since a plurality of types of offset voltages are output, even with variations in hardness among the MEMS mirrors and differences in hardness in vertical and horizontal directions, the maximum voltage to be output from the general-purpose DAC unit 350 can be suppressed.

When light input from the input channel "1" is output from the output channel "1", the computing unit 330 outputs to the general-purpose DAC unit 350 information about the drive voltages indicating that the input mirror voltages are such that the vertical voltage is "10 volts" and the horizontal voltage is "5 volts" and the output mirror voltages are such that the vertical voltage is "7 volts" and the horizontal voltage is "7 volts", and also outputs to the power supplying unit 340 information about the offset voltages indicating that the first offset voltage is "185 volts" and the second offset voltage is "140 volts".

The power supplying unit 340 obtains the information about the offset voltages from the computing unit 330, and outputs each of the offset voltages (first offset voltage and second offset voltage) to the voltage adding unit 360 based on the obtained information about the offset voltages.

Also, the power supplying unit 340 includes a plurality of power supplying units (may referred to as "sub-offset-voltage output unit") that output different offset voltages, such as a power supplying unit that outputs an offset voltage of "185 volts" and a power supplying unit that outputs an offset voltage of "140 volts". When the power supplying unit 340 outputs "185 volts" as a first offset voltage, the offset voltage is output from one of the power supplying units that outputs "185 volts".

The general-purpose DAC unit 350 obtains the information about the drive voltages from the computing unit 330, and outputs the drive voltages (first mirror voltage and second mirror voltage) to the voltage adding unit 360 based on the obtained information about the drive voltages. The general-purpose DAC unit 350 includes a plurality of general-purpose DACs.

For example, when obtaining the information about the drive voltages indicating that the input mirror voltages are such that the vertical voltage is "10 volts" and the horizontal voltage is "6 volts" and the output mirror voltages are such that vertical voltage is "7 volts" and the horizontal voltage is "7 volts", the general-purpose DAC unit 350 outputs to the voltage adding unit 360 the input mirror voltages including the vertical voltage of "10 volts" and the horizontal voltage of "6 volts" and the output mirror voltages including the vertical voltage of "7 volts" and the horizontal voltage of "7 volts".

The voltage adding unit 360 includes a plurality of voltage adding units, each adding the first offset voltage output from the power supplying unit 340 and the input mirror voltages input from the general-purpose DAC unit 350 together and applying the voltage obtained through addition to a relevant one of the MEMS mirrors of the input mirror 13 and also adding the second offset voltage output from the power supplying unit 340 and the output mirror voltages input from the general-purpose DAC unit 350 together and applying the voltage obtained through addition to a relevant one of the MEMS mirrors of the output mirror 14.

As has been explained above, the mirror driving circuit 300 according to the third embodiment includes a plurality of power supplying units 340 that output different offset voltages, and the offset voltages output from the power supplying unit 340 are added to the voltages output from the general-purpose DAC unit 350, thereby supporting variations in hardness among the MEMS mirrors and differences in hardness in vertical and horizontal directions, controlling the MEMS mirrors by the general-purpose DAC unit 350, and reducing cost of the mirror driving circuit (MEMS optical switch including the mirror driving circuit).

In the third embodiment, by way of example, the computing unit 330 computes offset voltages and, based on the computation results, the power supplying unit 340 outputs the offset voltages to the voltage adding unit 360. The present invention is not meant to be restricted to this, however, and the offset voltages to be output from the power supplying unit 340 may be set in advance for each MEMS mirror. Also, the mirror driving circuit 300 depicted in FIG. 6 is assumed to be connected to a MEMS optical switch as depicted in FIG. 13.

[d] Fourth Embodiment

Next, a mirror driving circuit according to a fourth embodiment is explained. In the mirror driving circuit according to the fourth embodiment, the general-purpose DAC unit outputs a plus voltage or a minus voltage to control the MEMS mirrors, thereby controlling the MEMS mirrors with a lower voltage and further reducing cost.

Figure 8:
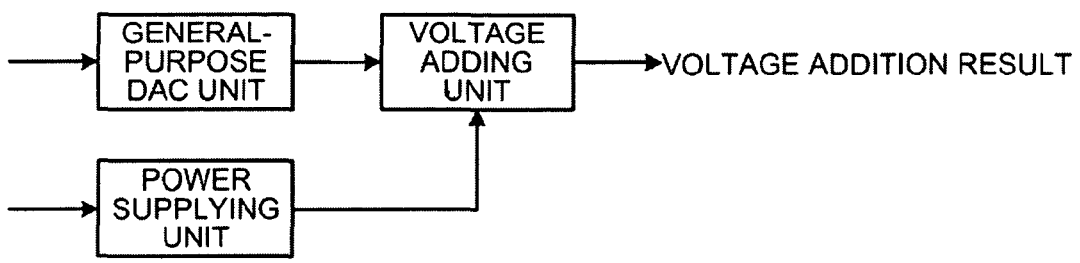
FIG. 8 is a drawing for explaining a required voltage of a general-purpose DAC unit that outputs only a plus voltage.
Figure 9:
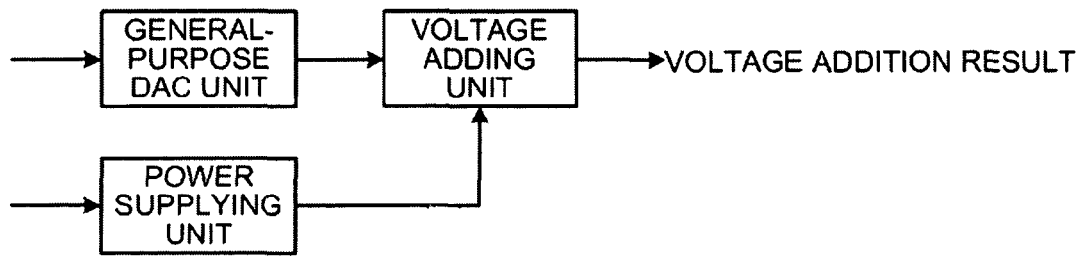
FIG. 9 is a drawing for explaining a required voltage of a general-purpose DAC unit that outputs a plus voltage and a minus voltage.

FIG. 8 is a drawing for explaining a required voltage of a general-purpose DAC unit that outputs only a plus voltage. FIG. 9 is a drawing for explaining a required voltage of a general-purpose DAC unit that outputs a plus voltage and a minus voltage. As depicted in FIG. 8, when it is assumed that a general-purpose DAC unit that outputs only a plus voltage is used, a power supplying unit outputs 185 volts as an offset voltage, and a voltage range for controlling the MEMS mirrors (voltage addition results) is 185 volts to 200 volts, the general-purpose DAC unit is required to output a voltage of 0 volt to 15 volts.

On the other hand, as depicted in FIG. 9, in the case of a general-purpose DAC that outputs plus and minus voltages, when it is assumed that a power supplying unit outputs 192.5 volts as an offset voltage and a voltage range for controlling the MEMS mirrors (voltage addition results) is 185 volts to 200 volts, the general-purpose DAC unit can control the MEMS mirrors in a range of −7.5 volts to +7.5 volts. Thus, a more general-purpose and lower-cost DAC unit can be used.

Figure 10:
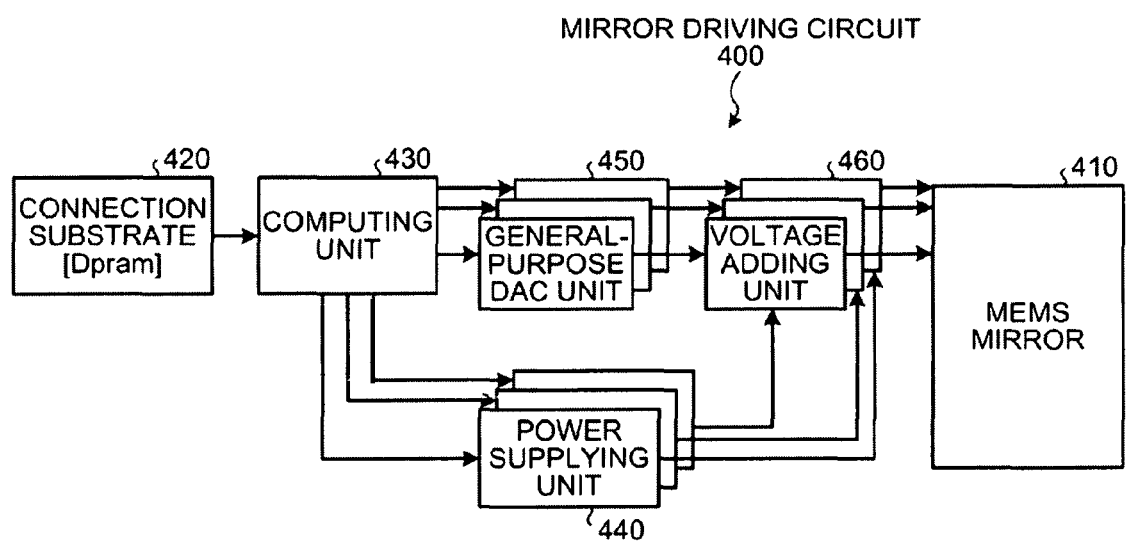
FIG. 10 is a functional block diagram of the configuration of a mirror driving circuit according to a fourth embodiment.

The configuration of a mirror driving circuit 400 according to the fourth embodiment is explained next. FIG. 10 is a functional block diagram of the configuration of the mirror driving circuit 400 according to the fourth embodiment. As depicted in FIG. 10, the mirror driving circuit 400 includes a MEMS mirror 410, a connection substrate (Dpram) 420, a computing unit 430 (applied-voltage determining unit), a power supplying unit 440 (offset-voltage output unit), a general-purpose DAC unit 450 (voltage output unit), and a voltage adding unit 460.

Among these, the MEMS mirror 410 corresponds to the MEMS mirrors (with n channels) placed on the input mirror 13 and the output mirror 14 depicted in FIG. 13. The MEMS mirror 410 is formed of 128 MEMS mirrors when the number of channels of the input port 11 is 60 and the number of channels of the output port 12 is 60, for example.

Each MEMS mirror included in the MEMS mirror 410 has an electrode in each of vertical and horizontal directions. With a voltage being applied to an electrode in one or both of the vertical direction and the horizontal direction, the angle of the mirror is controlled.

The connection substrate (Dpram) 420 is connected to a host device (not depicted in FIG. 10) to control data communications with the host device and to store connection information output from the host device. The connection information indicates a relation between the channels of the input port 11 and the channels of the output port 12 for connection. For example, the connection information includes information indicating that light output from the channel 1 of the input port 11 is input to the channel 2 of the output port 12.

The computing unit 430 computes drive voltages (vertical voltage and horizontal voltage) for driving the MEMS mirror 410 and offset voltages based on the connection information stored in the connection substrate 420 and outputs, as the computation results, information about the drive voltages to the general-purpose DAC unit 450 and information about the offset voltages to the power supplying unit 440.

Specifically, the computing unit 430 holds a management table, and compares the management table and the connection information to compute drive voltages and offset voltage. FIG. 11 is a drawing of an example of the data structure of the management table according to the fourth embodiment. As depicted in FIG. 11, the management table has stored therein an input channel, an output channel, a first offset voltage, input mirror voltages, a second offset voltage, and output mirror voltages in association with each other.

The input channel corresponds to a channel in the input port 11, while the output channel corresponds to a channel in the output port 12. The first offset voltage indicates an offset voltage to be applied to the input mirror 13. The input mirror voltages indicate voltages (vertical voltage and horizontal voltage) to be applied to a predetermined MEMS mirror placed on the input mirror 13.

The second offset voltage indicates an offset voltage to be applied to the output mirror 14. The output mirror voltages indicate voltages (vertical voltage and horizontal voltage) to be applied to a predetermined MEMS mirror placed on the output mirror 14.

When light input from the input channel "1" is output from the output channel "1", the computing unit 430 outputs to the general-purpose DAC unit 450 information about the drive voltages indicating that the input mirror voltages are such that the vertical voltage is "2.5 volts" and the horizontal voltage is "−2.5 volts" and the output mirror voltages are such that vertical voltage is "−0.5 volts" and the horizontal voltage is "−0.5 volts", and also outputs to the power supplying unit 440 information about the offset voltages indicating that the first offset voltage is "192.5 volts" and the second offset voltage is "147.5 volts".

The power supplying unit 440 obtains the information about the offset voltages from the computing unit 430, and outputs each of the offset voltages (first offset voltage and second offset voltage) to the voltage adding unit 460 based on the obtained information about the offset voltages.

Also, the power supplying unit 440 includes a plurality of power supplying units that output different offset voltages, such as a power supplying unit that outputs an offset voltage of "192.5 volts" and a power supplying unit that outputs an offset voltage of "147.5 volts". When the power supplying unit 440 outputs "192.5 volts" as a first offset voltage, the offset voltage is output from one of the power supplying units that outputs "192.5 volts".

The general-purpose DAC unit 450 obtains the information about the drive voltages from the computing unit 430, and outputs the drive voltages (input mirror voltage and output mirror voltage) to the voltage adding unit 460 based on the obtained information about the drive voltages, and includes a plurality of general-purpose DACs. Also, as explained with reference to FIG. 9, the general-purpose DAC unit 450 outputs plus and minus voltages.

For example, when obtaining the information about the drive voltages indicating that the input mirror voltages are such that the vertical voltage is "2.5 volts" and the horizontal voltage is "−2.5 volts" and the output mirror voltages are such that vertical voltage is "−0.5 volts" and the horizontal voltage is "−0.5 volts", the general-purpose DAC unit 450 outputs to the voltage adding unit 460 the input mirror voltages including the vertical voltage of "2.5 volts" and the horizontal voltage of "−2.5 volts" and the output mirror voltages including the vertical voltage of "−0.5 volts" and the horizontal voltage of "−0.5 volts".

The voltage adding unit 460 includes a plurality of voltage adding units, each adding the first offset voltage output from the power supplying unit 440 and the input mirror voltages input from the general-purpose DAC unit 450 together and applying the voltage obtained through addition to a relevant one of the MEMS mirrors of the input mirror 13 and also adding the second offset voltage output from the power supplying unit 440 and the output mirror voltages input from the general-purpose DAC unit 450 together and applying the voltage obtained through addition to a relevant one of the MEMS mirrors of the output mirror 14.

As has been explained above, in the mirror driving circuit 400 according to the fourth embodiment, the general-purpose DAC unit 450 outputs a plus voltage or a minus voltage to control the MEMS mirror 410, thereby controlling the MEMS mirror 410 with a lower voltage and further reducing cost.

In the fourth embodiment, by way of example, the computing unit 430 computes offset voltages and, based on the computation results, the power supplying unit 440 outputs the offset voltages to the voltage adding unit 460. The present invention is not meant to be restricted to this, however, and the offset voltages to be output from the power supplying unit 440 may be set in advance for each MEMS mirror. Also, the mirror driving circuit 400 depicted in FIG. 10 is assumed to be connected to a MEMS optical switch as depicted in FIG. 13.

Finally, a control voltage of a conventional DAC unit and the control voltages of the DAC unit in the first to fourth embodiments are explained. FIG. 12 is a drawing of a conventional management table with large variations in drive voltage of a MEMS switch.

In the case of large variations among MEMS mirrors (for example, 50 volts), the mirror driving circuits 100 and 200 according to the first and second embodiments require a DAC unit that can output a voltage of 55 volts. By applying the mirror driving circuit 300 in the third embodiment, control can be made with a general-purpose DAC of 14 volts at maximum. Furthermore, by applying the mirror driving circuit 400 in the fourth embodiment, control can be made with a general-purpose DAC unit of 7.5 volts at maximum. With this, a lower-cost general-purpose DAC can be used.

Among the processes explained in the embodiments above, all or part of processes explained as being performed automatically can be performed manually, or all or part of processes explained as being performed manually can be performed automatically with a known method. Also, the process procedure, the control procedure, the specific names, and information containing various data and parameters explained in the specification and depicted in the drawings can be arbitrarily changed unless otherwise specified.

Furthermore, the components of the mirror driving circuits 100, 200, 300, and 400 depicted in FIGS. 2, 4, 6, and 10 are functionally conceptual, and are not necessarily required to be configured physically in a manner as depicted in the drawings. That is, specific forms of distribution and unifications of each device are not restricted to those depicted in the drawings, and all or part thereof can be functionally or physically distributed or unified for configuration in arbitrary units according to various load, the state of use, and the like.

According to the embodiment of the mirror driving circuit, with application of offset voltages, the voltage for mirror control can be significantly reduced. With this reduction of the voltage for control, the DAC unit for mirror control can be replaced by a general-purpose DAC unit, thereby reducing cost of the mirror driving circuit.

Also, according to the embodiment of the mirror driving circuit, the voltage for mirror control and the offset voltage are added together in series, and the voltage obtained through addition is applied to the mirror. With this, the MEMS mirror can be controlled by a low-cost general-purpose DAC, thereby reducing cost of the mirror driving circuit.

Furthermore, according to the embodiment of the mirror driving circuit, a plurality of power supplying units that output different offset voltages are provided, and any of these different offset voltages is used for each mirror (or each electrode of the mirrors in vertical and horizontal directions), thereby supporting differences in control voltage due to variations in hardness among the MEMS mirrors and differences in hardness in vertical and horizontal directions, suppressing the voltage required for control, and controlling the mirrors with a low-cost general-purpose DAC.

Still further, according to the embodiment of the mirror driving circuit, a plus voltage or a minus voltage is output to control the mirrors, thereby controlling the mirrors with a lower voltage and further reducing cost.

Still further, according to the embodiment of the optical switch, with application of offset voltages, the voltage for mirror control can be significantly reduced. With this reduction of the voltage for control, the DAC unit for mirror control can be replaced by a general-purpose DAC unit, thereby reducing cost of the optical switch.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mirror driving circuit that controls an angle of a mirror to switch an optical path of light output from one of a plurality of input channels to one of a plurality of output channels by applying a voltage to tilt the mirror, the mirror driving circuit comprising:
    a voltage source that applies an offset voltage to an electrode of the mirror to which a ground potential is applied;
    a processor that determines an applied voltage to be applied to the mirror based on the angle of the mirror being determined by a combination of the input channel and the output channel forming a path of the light; and
    a digital-analog converter that applies to the mirror a remaining voltage obtained by subtracting the offset voltage from the applied voltage.

2. A mirror driving circuit that controls an angle of a mirror to switch an optical path of light output from one of a plurality of input channels-to one of a plurality of output channels by applying a voltage to tilt the mirror, the mirror driving circuit comprising:
    a first voltage source that outputs an offset voltage;
    a processor that determines an applied voltage to be applied to the mirror based on the angle of the mirror being determined by a combination of the input channel and the output channel forming a path of the light;
    a digital-analog converter that outputs a remaining voltage obtained by subtracting the offset voltage from the applied voltage; and
    a second voltage source that adds the offset voltage and the remaining voltage together and applies the added voltage to the mirror.

3. The mirror driving circuit according to claim 2, wherein the first voltage source includes a plurality of sub-voltage sources that output different offset voltages.

4. The mirror driving circuit according to claim 2, wherein the digital-analog converter outputs one of a plus voltage and a minus voltage so that the output voltage is equal to the remaining voltage obtained by subtracting the offset voltage from the applied voltage.

5. An optical switch transmitting an optical signal, comprising:
    a mirror driving circuit that controls an angle of a mirror to switch an optical path of light output from one of a plurality of input channels to one of a plurality of output channels by applying a voltage to tilt the mirror, the mirror driving circuit including
    a first voltage source that outputs an offset voltage,
    a processor that determines an applied voltage to be applied to the mirror based on the angle of the mirror being determined by a combination of the input channel and the output channel forming a path of the light,
    a digital-analog converter that outputs a remaining voltage obtained by subtracting the offset voltage from the applied voltage, and
    a second voltage source that adds the offset voltage and the remaining voltage together and applies the added voltage to the mirror.

6. The optical switch according to claim 5, wherein the first voltage source includes a plurality of-sub-voltage sources that output different offset voltages.

7. The optical switch according to claim 5, wherein the digital-analog converter outputs one of a plus voltage and a minus voltage so that the output voltage is equal to the remaining voltage obtained by subtracting the offset voltage from the applied voltage.

* * * * *